United States Patent [19]

Seo et al.

[11] Patent Number: 5,140,261

[45] Date of Patent: Aug. 18, 1992

[54] BEARING APPARATUS FOR A DRIVEN SHAFT OF AN AUTOMOBILE HAVING A ROTATIONAL SPEED DETECTOR

[75] Inventors: Nobuyuki Seo; Makoto Nohara, both of Osaka, Japan

[73] Assignee: Koyo Seiko Co., Ltd., Osaka, Japan

[21] Appl. No.: 815,918

[22] Filed: Jan. 6, 1992

Related U.S. Application Data

[63] Continuation of Ser. No. 626,311, Dec. 13, 1990, abandoned, which is a continuation of Ser. No. 469,183, Jan. 24, 1990, abandoned.

[30] Foreign Application Priority Data

Jun. 2, 1989 [JP] Japan ................... 1-141777

[51] Int. Cl.⁵ .................... G01P 3/48; G01P 3/54; G01B 7/14
[52] U.S. Cl. ..................... 324/173; 324/174; 324/207.22; 324/207.25
[58] Field of Search .............. 324/173, 174, 207.11, 324/207.13, 207.15, 207.22, 207.25; 310/155, 168, 171; 336/110, 96; 174/52.2

[56] References Cited

U.S. PATENT DOCUMENTS

| | | | |
|---|---|---|---|
| 4,024,483 | 5/1977 | Tomczak et al. | 336/96 |
| 4,847,557 | 7/1989 | Saito et al. | 324/173 |
| 4,970,462 | 11/1990 | Richmond | 324/174 |

FOREIGN PATENT DOCUMENTS

| | | |
|---|---|---|
| 3620884.1 | 12/1987 | Fed. Rep. of Germany . |
| 8800370.1 | 6/1989 | Fed. Rep. of Germany . |
| 63-166601 | 7/1988 | Japan . |
| 1353306 | 5/1974 | United Kingdom . |

OTHER PUBLICATIONS

Patent Abstracts of 63-166601, vol. 12, No. 432 (M-763) [3279], Nov. 15, 1988, p. 37.

Primary Examiner—Walter E. Snow
Attorney, Agent, or Firm—Wenderoth, Lind & Ponack

[57] ABSTRACT

A bearing apparatus is provided for a driven shaft of an automobile. It includes a rotational speed detector for detecting a rotational speed of a wheel of the automobile by detecting the rotational speed of a circular detected member which has a plurality of projections provided at even intervals in the circumferential direction. The detected member is fixed to one end of a driven shaft. The other end of the driven shaft includes a flange for mounting of a wheel. The shaft is part of an inside member which is rotatably supported by an outside member fixed to a chassis through a plurality of rolling elements. Detected speed is sent to an antilock brake system through a connector. The rotational speed detector, a cover fit to the outside member to enclose at least those parts of the rotational speed detector and detected member which are in opposition, and the connector are embedded in a resin block by a plastic molding technique such that they have a fixed relationship to each other so as to provide an assembly of unitary construction.

8 Claims, 4 Drawing Sheets

BEARING APPARATUS FOR A DRIVEN SHAFT OF AN AUTOMOBILE HAVING A ROTATIONAL SPEED DETECTOR

This application is a continuation of now abandoned application, Ser. No. 07/626,311 filed on Dec. 13, 1990, which is a continuation of now abandoned application, Ser. No. 07/469,183 filed on Jan. 24, 1990.

BACKGROUND OF THE INVENTION

The present invention relates to a bearing apparatus of a type used for bearing a driven shaft of an automobile and having a rotational speed detector which detects the rotational speed of the wheels connecting with the shaft so that the wheels do not lock, when brakes are suddenly applied, by controlling the brakes according to the detected rotational speed.

A conventional bearing apparatus of the above type is shown in FIG. 5 (according to Japanese Laid-open Patent Application No. 63-166601). This bearing apparatus has a cylindrically shaped outside member 50 fixed to a chassis of an automobile (not shown), a cylindrically shaped inside member 51 which includes a driven shaft and which is coaxially positioned inside of the outside member 50, rolling elements 52 in double rows which roll between a raceway surface 50a of the outside member 50 and a raceway surface 51f of the inside member 51, and retainers 53 which hold the rolling elements 52. The inside member 51 has a flange 51b at its one end 51a to which a wheel (not shown) is mounted, and a detected member 51e on the other end 51c. The detected member 51e has multiple projections 51d spaced apart at even intervals in a circumferential direction. A closed-end, cylindrically shaped cover 54 is provided at the end 50b of the outside member 50 in such a manner as to enclose the detected member 51e. A rotational speed detector 55 is fixed in said cover 54 and held in such a manner as to be opposed to said detected member 51e at a specified distance.

Mounting of the rotational speed detector 55 in the cover 54 is accomplished by first mounting the cover 54 to the end 50b of the outside member 50, and then press fitting the rotational speed detector 55 into a hole 54a of the cover 54. According to this mounting method for the rotational speed detector 55, it is impossible to place a jig having a strike surface inside of the cover 54 and to press fit the rotational speed detector until the rotational speed detector 55 is mounted. Therefore, the rotational speed detector 55 cannot be readily and precisely positioned relative to the detected member 51e. It might be possible to control the insertion of the rotational speed detector 55 by controlling the dimension (dimension d in FIG. 5) of a portion of the rotational speed detector projecting outwardly in the axial direction from the cover 54. However, there can be variations in said dimension in the axial direction. Therefore, precise positioning of the rotational speed detector 55 relative to the detected member 51e cannot be performed even with this method.

Because sufficiently high precision cannot thus be obtained in positioning the rotational speed detector 55 relative to the detected member 51e, the conventional bearing apparatus presents the problem of low precision in the rotational speed detection.

Furthermore, because the rotational speed detector 55 is fixed in the cover 54 by press fitting, the seal performance of the cover is low at the fitting portion, and water and other foreign matter can penetrate inside the cover. An additional problem concerns the gradual loosening of the cover at the fitting portion due to vibrations.

SUMMARY OF THE INVENTION

Therefore, the object of the present invention is to solve the above-mentioned problems and to provide a bearing apparatus for a driven shaft provided with a rotational speed detector which enables precise positioning of the rotational speed detector to a detected member, and also can achieve high seal performance and high vibration resistance, thereby enabling a high precision rotational speed detection for a long period of time.

In order to achieve the above object, a bearing apparatus of the present invention is characterized in that the cover, the rotational speed detector and the connector are fixedly connected to each other by a resin block formed through the use of a plastics molding technique so that the cover, the rotational speed detector and the connector are unitary. More specifically, the bearing apparatus of the present invention comprises a cylindrically shaped outside member which is fixed to a chassis of the automobile; a cylindrically shaped inside member which includes a driven shaft and which is rotatably supported by the outside member through rolling elements. The rolling elements are held by a retainer and roll between a raceway surface of the outside member and a raceway surface of the inside member, one end of the inside member having a flange for mounting a wheel thereon and the other end of the inside member having a circular detected member which has multiple projections provided at evenly spaced intervals in the circumferential direction of the detected member. The bearing apparatus also includes a rotational speed detector which is positioned in opposition to the detected member for detecting a rotational speed of the detected member, which is equivalent to that of the wheel, and for generating a rotational speed signal which is sent to an antilock brake system or similar device in the automobile through a connector. A cover is fit to the outside member for covering at least parts of the detected member and the opposing rotational speed detector. The rotational speed detector is fixed to the cover, and the cover, the rotational speed detector and the connector are fixedly connected to each other by a resin block formed through the use of a plastics molding technique so that the cover, the rotational speed detector and the connector are unitary.

According to this characteristic feature of the present invention, the cover, the rotational speed detector and the connector provide an assembly of one-piece construction and therefore, they can be treated as a single unit.

The cover, rotational speed detector, and connector which are unitary are installed and positioned with a single action by simply mounting the cover to the outside member. Thus, unlike the conventional bearing apparatus, it is not necessary to go through multiple steps to install them.

Because the rotational speed detector is fixedly connected with the cover by a resin block so that each member may be held precisely at its predetermined position according to the present invention, the rotational speed detector is positioned relative to the detected member with significantly greater precision than is possible with the conventional apparatus. Thus, the rotational speed detector accurately detects the passage of the projections on the circumference of the detected member, and is thus able to accurately detect the rotational speed of the inside member, and therefore, of the wheel. The rotational speed detector outputs a rotational speed signal which corresponds accurately to the rotational speed of the inside member. The rotational speed signal from the rotational speed detector is sent to an antilock brake system or similar device through the connector which is integrated with the cover and the rotational speed detector.

Because the cover, the rotational speed detector and the connector are connected to each other by a resin block formed through the use of a plastic molding technique, fitting portions thereof are tightly covered by the resin block. The molded resin has an appropriate thickness so that it can properly integrate the particular members. Therefore, the monolithically molded cover, rotational speed detector, and connector offer high sealing performance, such that water and other foreign matter is prevented from coming in contact with the parts of the detected member and the opposing rotational speed detector. Furthermore, these members are integrated with high rigidity so that the position of the rotational speed detector to the cover will not shift, the rotational speed detector will not separate from the cover because of vibration action, and the sealing performance will thus not deteriorate. Thus, high precision detection of the rotational speed can be maintained over an extended period of time.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
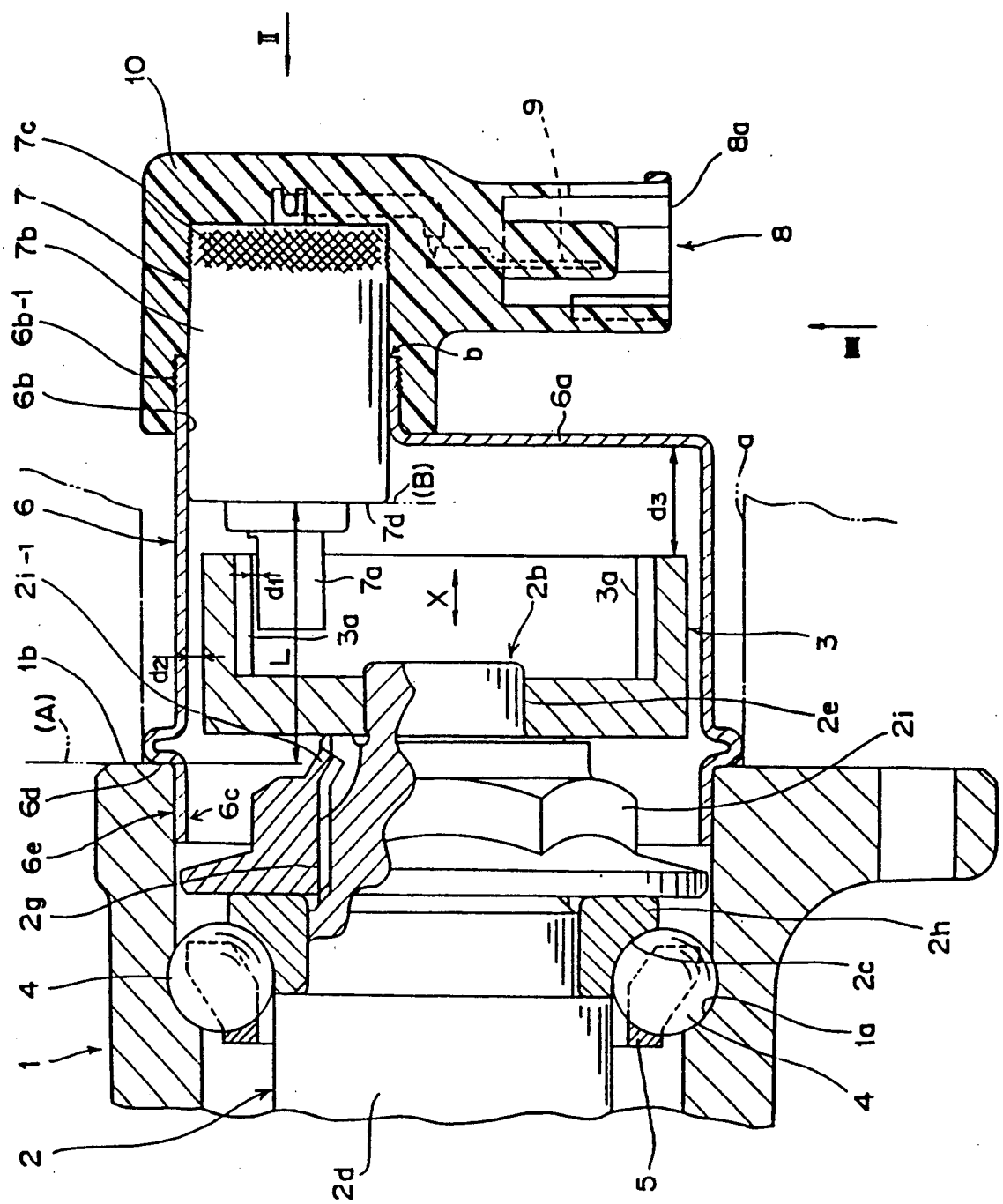
FIG. 1 is a cross sectional view taken along the axial direction of an essential part of a preferred embodiment of the present invention, showing a cover, a rotational speed detector, and a connector which are embedded in a resin block.

Referring now to FIG. 1, reference number 1 is a cylindrically shaped outside member mounted to a suspension member 'a' of a chassis of an automobile (not shown), and 2 is a cylindrically shaped inside member which includes a driven shaft $2d$ extending inside of the outside member 1 in the axial direction indicated by X. On one end (corresponding to $51a$ in FIG. 5) of the inside member 2 which would be at the left side of FIG. 1 but which is not shown in this figure is a flange similar to the one of FIG. 5 to which is to be mounted a wheel, and to the other end $2b$ of the inside member 2 is attached an annular detected member 3. This detected member 3 has a U-shaped cross section and multiple projections $3a$ (only two of them are shown) provided at even intervals around the inside circumference at the detected member 3. Mounting of the detected member 3 to the end $2b$ is accomplished by means of press fitting of the detected member 3 on a round postshaped fitting portion $2e$.

Figure 5:
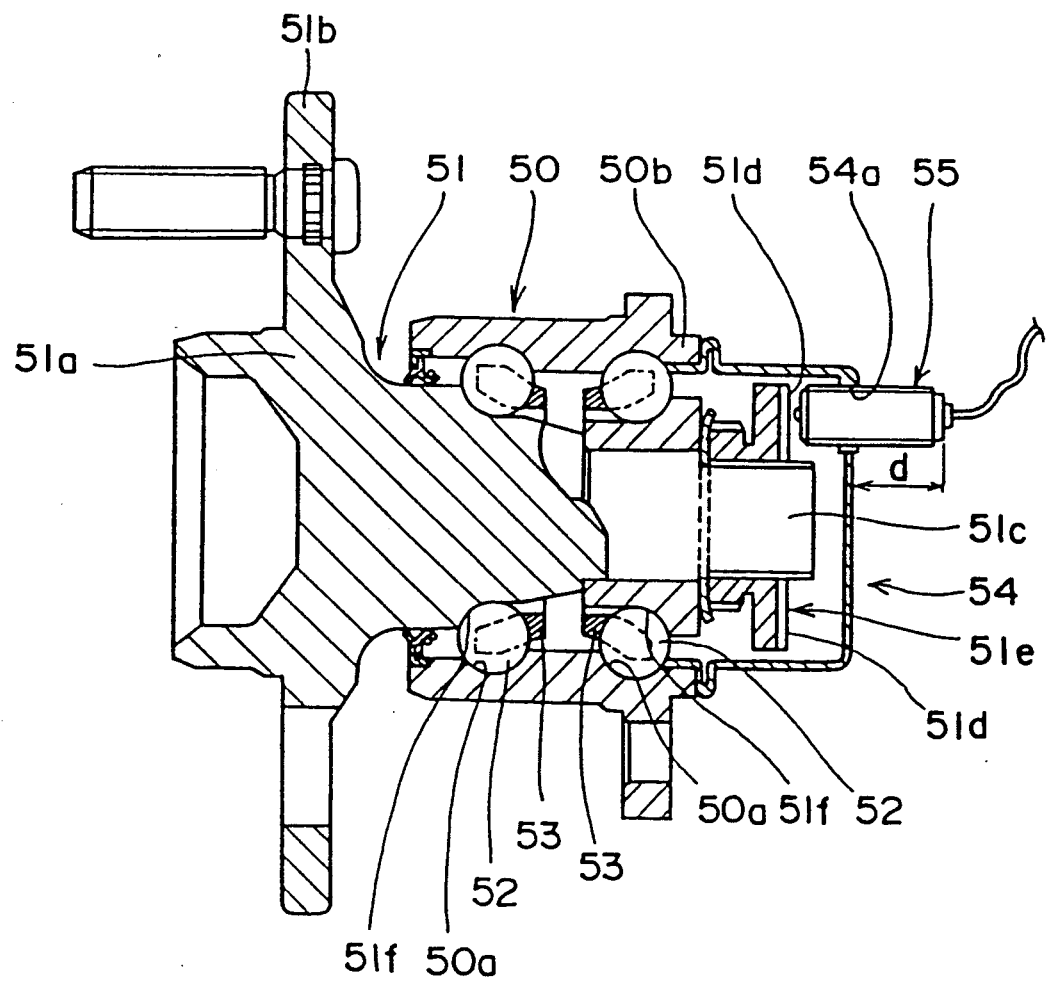
FIG. 5 is a cross sectional view taken in the axial direction of a conventional axle bearing apparatus provided with a rotational speed detector.

Reference numbers 4 are the rolling elements which roll between a raceway surface $1a$ of the outside member 1 and a raceway surface $2c$ of the inside member 2. Although not shown in FIG. 1, two rows of rolling elements are provided in the same manner as shown in FIG. 5, as are the raceway surface $1a$ of the outside member 1, and the raceway surface $2c$ of the inside member 2. The inside member 2 is rotatably held by the outside member 1 through the double rows of the rolling elements 4.

A retainer 5 holds the rolling elements 4 evenly spaced apart in the circumferential direction of the inside member. A second retainer 5 is, of course, provided for holding the second row of the rolling elements which are not shown in FIG. 1.

An annular raceway member $2h$ having the raceway surface $2c$ on its outer periphery is fixed to the driven shaft $2d$ by means of a nut $2i$ which is screwed onto a threaded portion $2g$ of the driven shaft $2d$. The nut $2i$ is locked to the driven shaft $2d$ by bending a tab $2i$-1 projecting from the nut $2i$ into a notch provided at a specified position of the threaded member $2g$. In this way the nut $2i$ is prevented from loosening from the driven shaft $2d$.

Reference number 6 represents a cover mounted to the outside member 1 and having a semi-closed, cylindrical shape. At a specified position in its free end $6a$ is provided a fitting hole (or opening) $6b$, and at its open (fixed) end $6c$ is provided a fitting $6e$ having a seat $6d$ projecting outwardly in the radial direction. The seat $6d$ rests against an end surface $1b$ of the outside member 1 when the cover 6 is mounted to the outside member 1.

Reference number 7 represent a rotational speed detector which is fit to the fitting hole $6b$ of the cover 6. The rotational speed detector 7 has a main body $7b$ and a detector portion $7a$ which are aligned in the axial direction X. When the cover 6 is mounted to the outside member 1, the rotational speed detector 7 is positioned accurately relative to the cover 6 such that the detector portion $7a$ is spaced radially by a distance d1 from the projections $3a$ when the projections $3a$ are at the top of the detected member 3 when as shown in FIG. 1.

Figure 2:
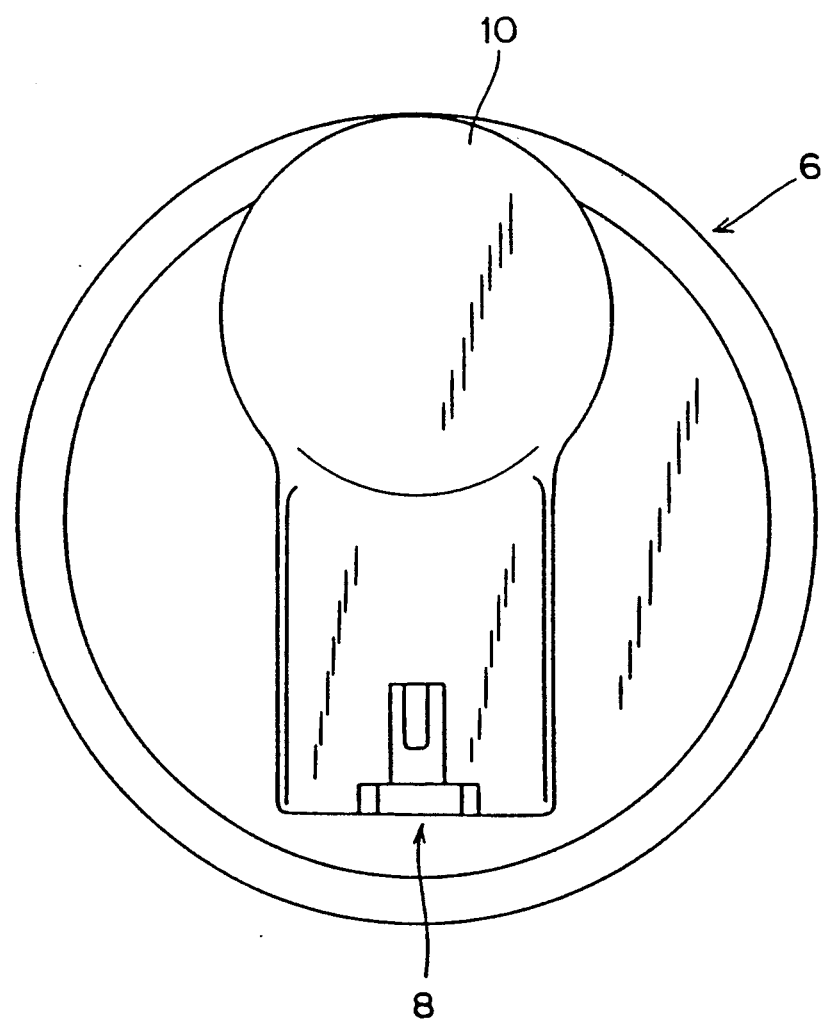
FIG. 2 and FIG. 3 are elevation views in the directions of arrows II and III, respectively, of the cover, the rotational speed detector, and the connector of FIG. 1 which are embedded in a resin block.

The cover 6 and the rotational speed detector 7 are connected to each other by a one piece resin block 10 formed about the detector 7 and the cover 6 through the use of plastic molding techniques. In other words, both the detector 7 and the cover 6 are embedded in the resin block 10. As shown in FIGS. 1 and 2, the resin block 10 is mounted such that it is entirely within the largest diametric dimension of the cover 6 as projected in an axial direction.

Figure 3:
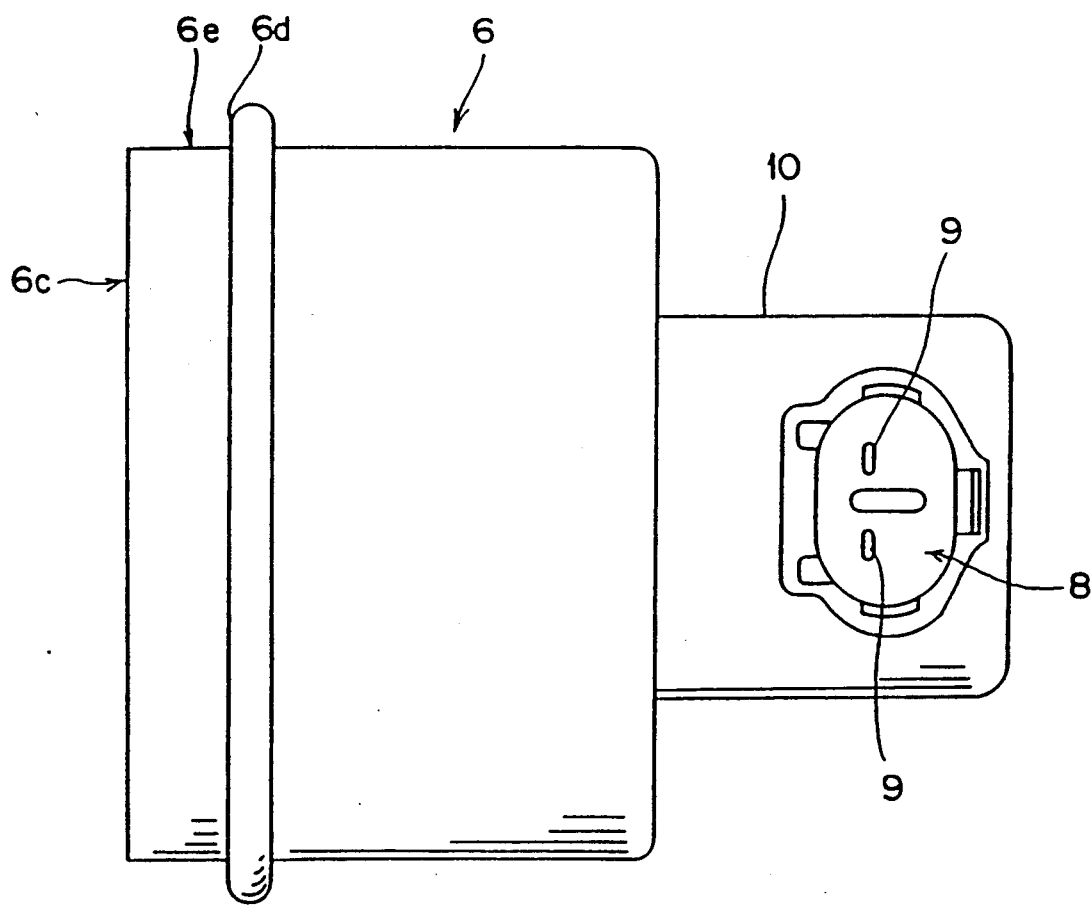

Reference number 8 represents a connector molded integrally with the resin block 10 at a specified position relative to the cover 6 and the rotational speed detector 7. Thus, the cover 6, rotational speed detector 7 and connector 8 provide an assembly of integral construction with the help of the resin block 10. The connector 8 consists of a connector housing $10a$ and a pair of terminals 9 (see FIGS. 1 and 3). The connector housing $10a$ is formed by using a molding die of a corresponding shape. Therefore, it is not necessary to use a separate connector housing. A hole or opening $8a$ formed in the connector housing 10a extends in the direction perpendicular to the axial direction X. The pair of terminals 9 is provided at a portion defining a base of the connector housing 10a. A plug (not shown) which is complementary to the connector 8 can be connected to the connector 8 for extracting a detected rotational speed signal from the rotational speed detector 7. The detected rotational speed signal is sent through the connector 8 to an antilock brake system, which is not shown in the figure.

The cover 6 includes an annular flange b formed about the opening 6b of for connecting the resin block 10 to the cover 6. This allows the opening 6b to be completely sealed by means of being completely covered with the resin block 10 to a specified thickness. The fitting portion 6e of the cover 6 is also tightly fitted to the outside member 1. Therefore, once the integrally molded cover, rotational speed detector and connector are mounted to the outside member as shown in FIG. 1, the penetration of water and other foreign matter to the inside of the cover 6, such as may occur in a conventional bearing apparatus wherein a rotational speed detector is press fit to a cover, is effectively prevented.

Furthermore, the peripheral surface of the main body 7b of the rotational speed detector 7 at an end 7c is knurled, and an outside surface 6b-1 of the fitting hole 6b of the cover 6 is likewise knurled. These knurled surfaces help assure a more positive anchor and sufficient rigidity in the resin 10 when the cover 6, rotational speed detector 7, and connector 8 are molded together. Therefore, even if vibrations or other outside factors work on the cover 6, the position of the rotational speed detector 7 will not shift in the axial direction relative to the cover 6, and the rotational speed detector 7 will not become biased with respect to the axis X. In short, high vibration resistance is assured.

In the dies used for molding the resin block 10, a reference face (A) used to position the seat 6d of the cover 6 and a reference face (B) used to position an end 7d of the main body 7b of the rotational speed detector 7 are provided at a specified distance L from each other. By setting the seat 6d of the cover 6 at the reference face A and at the same time by setting the end 7d of the rotational speed detector 7 at reference face B, the cover 6, the rotational speed detector 7, and the terminals 9 of the connector 8 are molded into an integrated member with the rotational speed detector 7 mounted with high precision to the cover 6. As described above, the connector housing 10a is formed during this molding process. When the integrated member 6, 7, 8 is mounted in place by merely mounting the cover 6 to the outside member 1, the detected member 3 is precisely positioned so as to provide gaps d2 and d3 in the radial and axial directions, respectively, to between the detected member 3 and the cover 6.

In addition to this precise positioning, the mounting of the integrated member is very simple, for it is not necessary to go through multiple steps in the assembly process of the bearing apparatus to mount the rotational speed detector to the outside member as is required with conventional axle bearing apparatuses in which a cover is first mounted to an outside member, and a rotational speed detector separate from the cover is then press fit into the cover.

Due to the various features described above, the bearing apparatus of this embodiment can assure a high precision in detecting the rotational speed of wheels, and can maintain this high detection precision for an extended period of time.

It is to be noted that many variations and modifications of the above embodiment are possible. Some of them are as follows.

The connector is not limited to the above embodiment in which the opening is in a direction perpendicular to the axial direction. Rather the connector may also open in the axial direction or at any specific angle to the axial direction. Furthermore, the connector may be a preformed connector which may be integrated with the cover and the rotational speed detector during the molding process.

The position and thickness of the resin which is used to mold or connect the cover, the rotational speed detector, and the connector together shall also not be limited to the position and thickness described above, but may be selected as desired so long as high sealing performance and vibration resistance are provided in the manner described above.

The detected member may also be one in which the multiple projections are directed outwardly in the radial direction at uniform intervals about the outer circumference of the detected member. In this case, the rotational speed detector shall be integrated to the cover such that the portion 7a of the detector 15 positioned outside of the detected member in the radial direction and in opposition to the detected member in the radial direction. Furthermore, the detected member may include multiple projections projecting in the axial direction at even intervals in the circumferential direction (see FIG. 4). In this case, the rotational speed detector shall be integrated with the cover so as to be in opposition to the detected member in the axial direction. Moreover, the detected member may also include multiple projections which are disposed at a specific angle relative to the axial direction. In this case, the rotational speed detector shall, of course, be integrated with the cover so as to properly opposed the detected member at that specific angle relative to the axial direction. In any case, the cover shall cover at least the parts of the detected member and rotational speed detector which are in opposition to one another.

Figure 4:
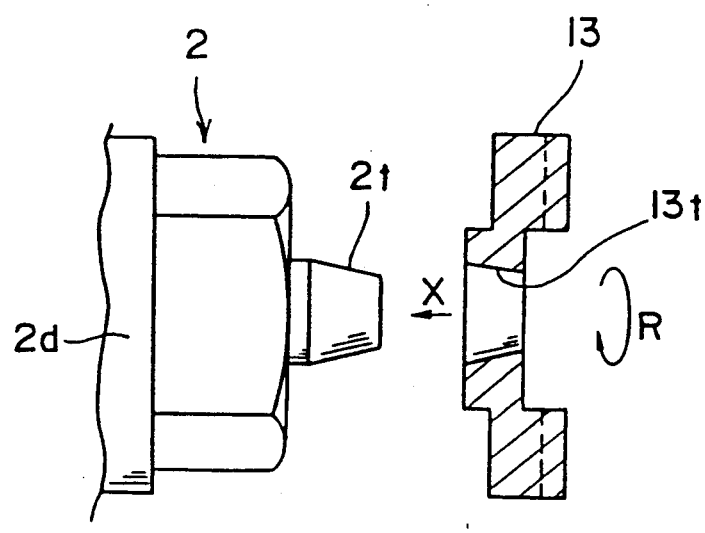
FIG. 4 is a diagram showing a modification of the detected member.

Furthermore, mounting of the detected member to the axle shaft shall not be limited to the press fitting. As shown in FIG. 4, a tapered member 2t may be provided on a driven shaft 2d of an inside member 2, and a tapered hole 13t may be formed at the center of a detected member 13 with a taper angle corresponding to the angle of the tapered member 2t. While the axle shaft 2d is turned in the direction of arrow R, the detected member 13 is pressed in the direction of arrow X to be fixed onto the tapered member 2t by friction welding.

In addition, locking of the nut 2i to the driven shaft 2d can also be achieved by fixing a ring member (not shown) onto the driven shaft adjacent to the nut in the axial direction by means of friction welding. In this case, the detected member having plural projections may be positioned next to or around the ring member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claim is:

1. A bearing apparatus for a driven shaft of an automobile, comprising:

a cylindrical outside member adapted to be mounted to a chassis of the automobile in surrounding relation to the driven shaft;

a cylindrical inside member mounted concentrically within said cylindrical outside member and adapted to be fixed for rotation with the driven shaft;

means, comprising rolling elements, for rotatably mounting said cylindrical inside member within said cylindrical outside member for rotation relative to said cylindrical outside member;

a circular detected member fixed to said cylindrical inside member for rotation therewith about an axis and having a plurality of projections spaced evenly apart in a circumferential direction of said circular detected member; and a unitary member including a substantially cylindrical cover which has a free end provided with an opening in a position offset relative to a center of said free end of said cylindrical cover, which is connected to said cylindrical outside member so as to cover at least parts of said circular detected member, and which has a predetermined diameter, a rotational speed detector mounted and disposed within said opening so that a central axis of said rotational speed detector is substantially coextensive with a central axis of said opening and so as to be positioned opposite from said plurality of projections of said circular detected member and including means for detecting rotational speed of said circular detected member and for generating a rotational speed signal indicative of the rotational speed of the driven shaft, an integrally molded resin block having an L shape, one end of the resin block being fixed to said cover about said opening and fixed to said rotational speed detector, and the other end of said resin block being disposed in a space resulting from a dimensional difference between a dimension of said rotational speed detector and said predetermined diameter of said cylindrical cover so that said other end of said resin block is inside an outer circumference of said cylindrical cover, and a connector means molded integrally with said other end of said molded resin block for detechably connecting said rotational speed detector electrically to a plug of a system which will utilize said rotational speed signal, said connector means extending away from said rotational speed detector in a direction normal to said axis about which said circular detected member is rotatable.

2. A bearing apparatus as recited in claim 1, wherein said connector means includes a recessed connector housing and a pair of electrical terminals mounted therein.

3. A bearing apparatus as recited in claim 1, wherein said cover includes an annular flange formed about said opening for uniting said molded resin block with said cover.

4. A bearing apparatus as recited in claim 3, wherein said annular flange is formed integrally with said cover.

5. A bearing apparatus as recited in claim 3, wherein said annular flange includes a knurled portion for making positive connection with said molded resin block.

6. A bearing apparatus as recited in claim 5, wherein said rotational speed detector includes a first end extending inwardly of said cover and a second end extending outwardly of said cover and united with said molded resin block, said second end of said rotational speed detector having a knurled portion for making a positive connection with said molded resin block.

7. A bearing apparatus as recited in claim 1, wherein said plurality of projections of said circular detected member face in an axial direction of said circular detected member.

8. A bearing apparatus as recited in claim 1, wherein said rotational speed detector includes a main body disposed in and coaxially with said opening, and a detector portion extending away from and coaxially with said main body.

* * * * *

UNITED STATES PATENT AND TRADEMARK OFFICE
CERTIFICATE OF CORRECTION

PATENT NO. : 5,140,261

DATED : August 18, 1992

INVENTOR(S) : Nobuyuki SEO et al.

It is certified that error appears in the above-identified patent and that said Letters Patent is hereby corrected as shown below:

In claim 1, column 8, line 3, for "detechably" read --detachably--.

Signed and Sealed this

Thirty-first Day of August, 1993

Attest:

BRUCE LEHMAN

Attesting Officer     Commissioner of Patents and Trademarks